Jan. 16, 1945.  M. J. GIELEGHEM  2,367,574
RADIUS FIXTURE
Filed March 1, 1943  2 Sheets-Sheet 1
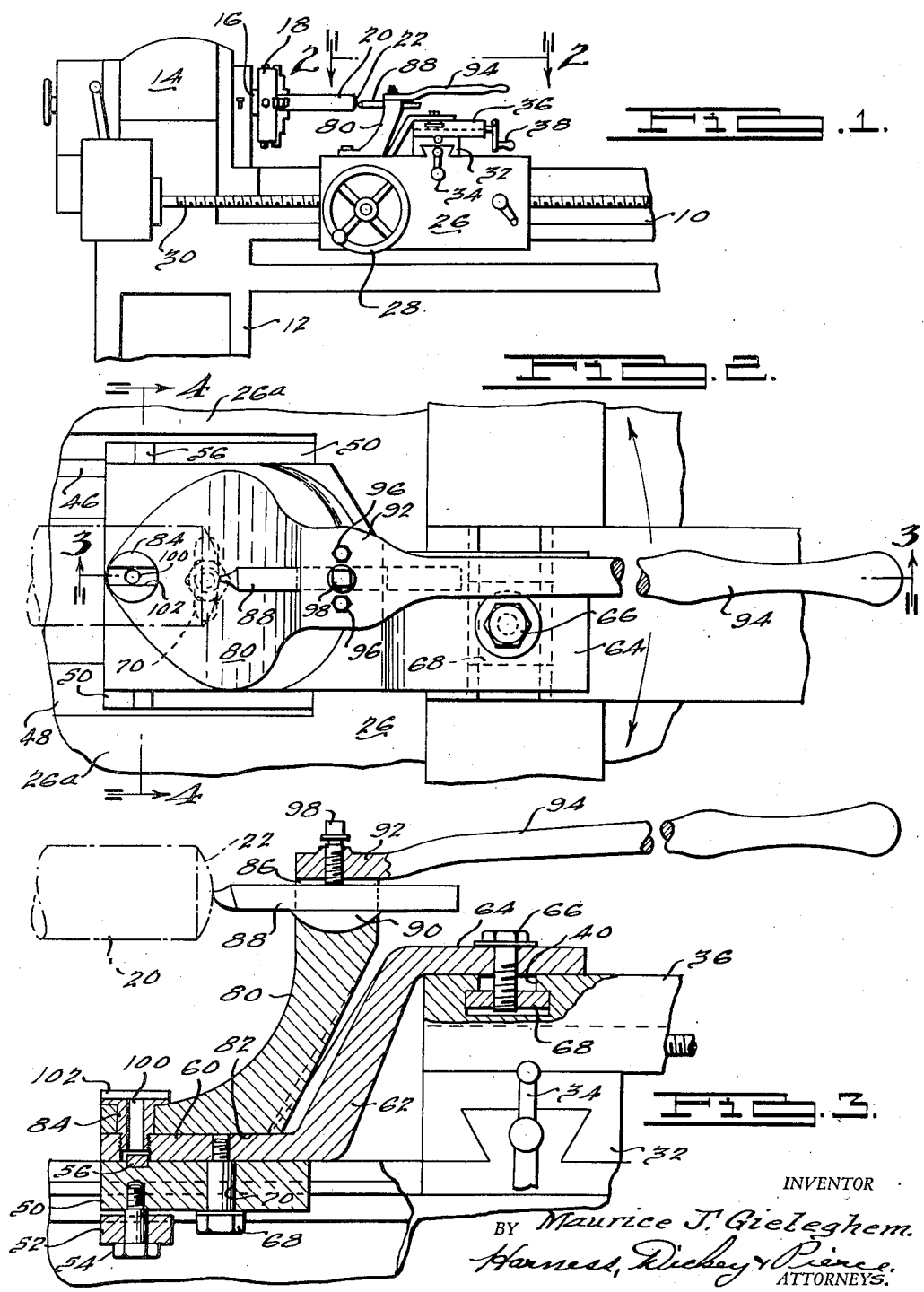
INVENTOR
BY Maurice J. Gieleghem.
Harness, Dickey & Pierce
ATTORNEYS.

Jan. 16, 1945.  M. J. GIELEGHEM  2,367,574
RADIUS FIXTURE
Filed March 1, 1943   2 Sheets-Sheet 2
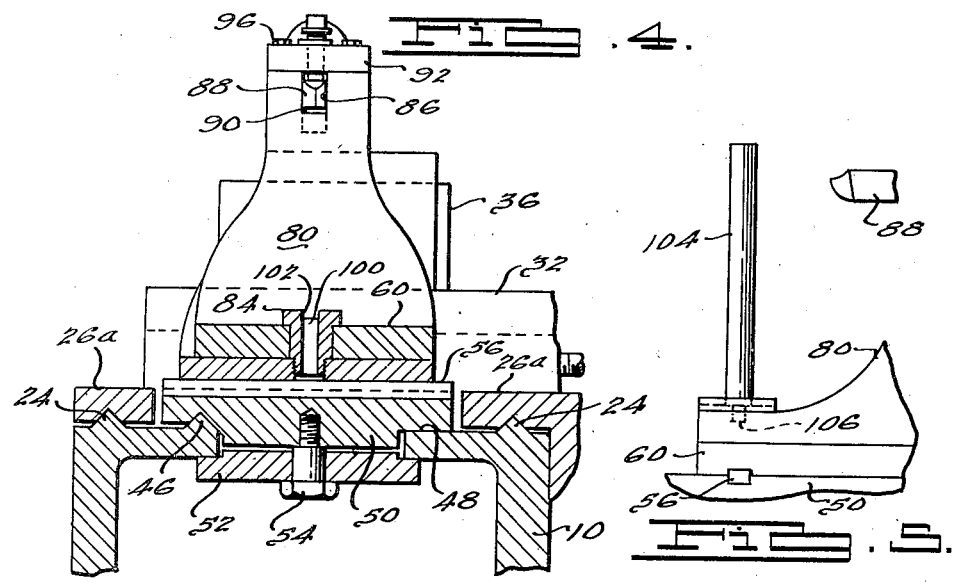
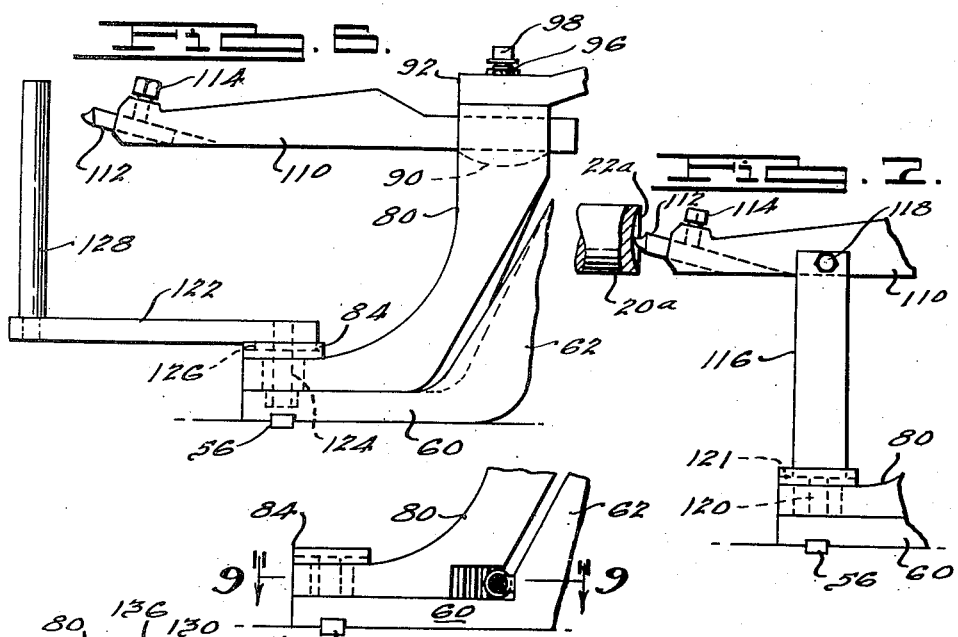
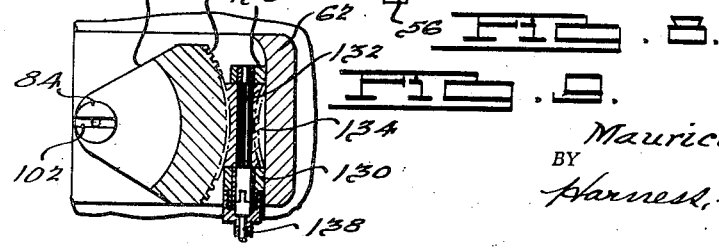
INVENTOR
Maurice J. Gieleghem.
BY
Harness, Dickey & Pierce.
ATTORNEYS.

Patented Jan. 16, 1945

2,367,574

UNITED STATES PATENT OFFICE 2,367,574

RADIUS FIXTURE

Maurice J. Gieleghem, Detroit, Mich.

Application March 1, 1943, Serial No. 477,555

2 Claims. (Cl. 82—12)

This invention relates to radius fixtures, that is to fixtures of the type employed in lathes and similar turning machine tools for forming radii or partially spherical surfaces on workpieces, the principal object being the provision of a fixture of the type described that is simple and rugged in construction, efficient in operation, economical to build, and easy to operate.

Objects of the invention include the provision of a radius fixture for lathes and similar machine tools capable of turning both convex and concave radii and partially spherical surfaces; the provision of a fixture of the type described adapted to be mounted on a lathe or similar machine tool in a new and novel manner; the provision of a radius fixture of the type described that is responsive in movement to the usual tool feeding movements of a lathe or like machine tool both longitudinally and transversely thereof; the provision of a radius fixture of the type described which while fully responsive to all of the movements of the usual tool supporting member of the lathe or the like does not depend solely upon the carriage and the cross-slide of the lathe for support; the provision of a radius fixture of the type described which derives its principal support directly from the bed of the lathe or the like with which it is associated; the provision of a radius fixture of the type described having novel means associated therewith for accurately locating the point of the tool in the turning of a radius or a partially spherical surface of a predetermined radius; the provision of a radius fixture of the type described providing a novel outboard support for a cutting tool when employed for turning concave surfaces; and the provision of a radius fixture of the type described constructed for power operation.

The above being, among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary, side elevational view of a lathe provided with a radius fixture constructed in accordance with the present invention;

Fig. 2 is an enlarged, fragmentary plan view of the radius fixture shown in Fig. 1, together with associated lathe parts, and taken as looking on the line 2—2 of Fig. 1;

Fig. 3 is a partially broken, vertical sectional view taken on the line 3—3 of Fig. 2;

Fig. 4 is a fragmentary, vertical sectional view taken transversely of the radius fixture shown in the preceding views as on the line 4—4 of Fig. 2;

Fig. 5 is a fragmentary, side elevational view illustrating the gage employed for setting the tool in the fixture when adjusted for turning a convex surface of predetermined radius on a piece of work, and illustrating the manner in which the gage is mounted in the fixture;

Fig. 6 is a fragmentary side elevational view illustrating a preferred form of tool and tool holder employed with the fixture shown in the preceding views for turning a concave surface in the end of a piece of work, together with a gage means for setting the point of the tool into accurate conformance with the radius of the desired surface to be turned;

Fig. 7 is a fragmentary side elevational view illustrating a novel form of outboard support for the form of tool holder illustrated in Fig. 6;

Fig. 8 is a fragmentary, side elevational view illustrating a modification of the structure shown in the preceding views adapting it for power drive; and, Fig. 9 is a fragmentary plan view taken on the line 9—9 of Fig. 8 and illustrating the drive mechanism in more detail.

Generally speaking it is not new to provide a radius fixture for a lathe or similar machine tool whereby a cutting tool is mounted for bodily movement about an axis intended to intersect the center of curvature of a radius or of a spherical or a partially spherical surface desired to be turned upon a piece of work. However, as far as I am aware, in the past it has been conventional practice to mount such fixtures in place of the usual tool holder on the compound slide of the lathe and rely entirely upon such slide for its support. This has not proven entirely satisfactory, particularly in those cases where the point of a tool is located at a material distance from the center of the tool support, for in such case the leverage through which the force acting on the point of the tool acts is so great as to cause chattering of the tool in the work and prevents other than relatively light cuts to be taken. This situation is particularly bad if any material amount of wear has occurred between the slides and their cooperating parts. The present invention provides a construction which eliminates the above described disadvantages of previous constructions in that it is supported substantially directly from the bed of the lathe and, therefore, receives the bulk of its support directly therefrom. At the same time it is so constructed that it is capable of all adjusting movements that would otherwise be the case if supported in the conventional manner in place of the usual tool post.

Referring now to the accompanying drawings and particularly to Fig. 1, a conventional type of lathe is illustrated as comprising a bed 10 supported at opposite ends by legs or columns 12 and provided with a conventional driving head indicated generally at 14 in which a usual spindle 16 is rotatably supported and driven in any suitable or conventional manner. In the particular case shown the spindle 16 is shown as carrying a chuck 18 in which is secured a piece of work 20, for the purpose of illustration shown as a short length of shaft, and upon the outer or righthand end thereof it is assumed it is desired to form a convex partially spherical surface 22.

As best illustrated in Fig. 4 the bed 10 on its upper surface and adjacent each outer side thereof is provided with an upwardly projecting inverted V sectioned way 24 and a conventional carriage 26 is slidable longitudinally of the bed 10 upon the ways 24. The carriage 26 may be assumed to be of conventional H-shape in plan view, the legs 26a thereof overlying and being formed for complementary reception of the ways 24. The movement of the carriage 26 longitudinally of the ways 24 may be controlled manually through a conventional hand wheel 28 or it may be power driven through the usual feed screw 30 in accordance with conventional practice.

The carriage 26 is provided with the usual cross-slide 32 thereon which may be manually controlled in accordance with conventional practice by means of a hand lever 34. The cross-slide 32 is in turn provided with the usual compound slide 36 mounted thereon for adjustment about a vertical line in accordance with conventional practice, and which cross-slide may be manually actuated in the direction of its length by means of a conventional hand lever 38. In Fig. 1 the compound slide 36 is illustrated as being adjusted for movement in the same direction as the carriage 26 upon the ways 24, this being for the purpose of illustration only, as it will be appreciated from the following description that the particular position of the compound slide 36 has no relation to the proper functioning of the device of the present invention. As best brought out in Fig. 3 the compound rest 36 is provided with the usual inverted T-sectioned slot 40 therein by means of which the usual and conventional tool post when employed is secured to the compound rest 36.

Lathes such as that shown are usually provided with a tail stock (not shown) and, as best illustrated in Fig. 4, such tail stock is mounted for movement longitudinally of the bed 10 by means of a pair of ways on the upper surface thereof positioned inwardly of the carriage ways 24. Ordinarily such tail stock ways comprise an inverted V way such as 46 and a flat way such as 48 and this is the construction shown. These ways being inside the outer ways 24, it permits the tail stock to be moved within the rearwardly extending legs 26a of the carriage 26 as will be appreciated by those skilled in the art.

In accordance with the present invention the radius fixture is supported primarily by the tail stock ways 46 and 48. Accordingly, it comprises a rigid cross-member 50, preferably of cast construction, which spans the ways 46 and 48 and is formed for complementary reception thereon and is, therefore, guided for accurate movement longitudinally of the bed 10. It is of such length, as illustrated in Figs. 2 and 4, as to be freely receivable between the forwardly extending legs 26a of the carriage 26. If desired the member 50 may be held down securely on the ways 46 and 48, so as to prevent vertical movement thereof on the ways but without restricting sliding movement of the member 50 longitudinally of the ways, by a conventional form of clamping plate 52 underlying the inwardly turned upper edge portions of the bed 10 and secured to the cross-member 50 by means of a shouldered bolt 54. The plate 52 will ordinarily not be necessary because, as will hereinafter be apparent, the pressure of the work on the tool will ordinarily be in a direction to force the member 50 downwardly on the ways 46 and 48.

As best brought out in Figs. 2 and 3 the member 50 has partially imbedded in its upper face a key 56 lying in a horizontal plane and perpendicular to the ways 24. That portion of the key 56 which projects above the upper face of the member 50 is relatively closely but slidably received in a complementary groove formed in the lower face of the foot portion 60 of a bracket 62 which extends upwardly and rearwardly from such foot portion 60 and terminates at its upper end in a rearwardly directed arm 64 which is received in flat contacting relationship against the upper surface of the compound slide 36 and over the T-slot 40 thereof. A bolt 66 projects downwardly through the arm 64 centrally of the slot 40 and its lower end is threaded into a clamping plate 68 located in the head portion of the slot 40 so that upon tightening up of the bolt 66 the arm 64 is rigidly locked to the compound slide 36. The foot 60 of the bracket 62 is maintained in firm but sliding engagement with the upper face of the member 50 by means of a shouldered bolt 68 which projects upwardly through a transverse slot 70 in the member 50 and at its upper end threads into the foot 60, the slot 70 being of sufficient length to provide for the available transverse movement of the bracket 62 on the member 50 between the arms 26a of the carriage 26. As in the case of the clamping plate 52, the bolt 68 is not ordinarily required to maintain contact of the foot 60 with the member 50 as the pressure of the work on the tool will ordinarily maintain these parts in firm engagement. It is, however, desirable to use it to keep the two parts from becoming separated from one another when not mounted on a lathe.

In view of the above explanation it will be appreciated that the bracket 62 being rigidly secured to the compound slide 36 and the compound slide being movable transversely of the bed 10 with the slide 32 upon rotation of the hand lever 34, during such movement of the slide 32 the bracket 62 will move transversely with it and will slide over the upper surface of the member 50, as guided by the key 56, in such case. If the carriage 26 is caused to slide along the ways 24, as by means of rotation of the hand wheel 28, then both the member 50 and the bracket 62 will be caused to slide longitudinally on the ways 46 and 48 in exact accordance therewith. Furthermore, if the compound slide 36 is turned to the position illustrated in the drawings, that is, for movement parallel to the ways 24, upon rotation of the hand lever 38 it will be operated in such direction, and then the member 50 and bracket 62 will move along the ways 46 and 48 but in this case without a corresponding movement of the carriage 26. It will be appreciated that if the compound slide 36 is turned into parallelism with the cross-slide 32 and operated in such direction the bracket 62 will be caused to move crosswise of the ways 24 in exactly the same manner as though such movement was caused by movement of the cross-slide 32. It will be further appreciated that if the compound slide 36 is turned to a position in which it is at an angle both to the ways 24 and to the cross-slide 32, then upon movement in such direction the member 50 will be caused to move longitudinally of the ways 46 and 48 and at the same time the bracket 62 will be caused to move across the upper face of the member 50. Thus by movement of the usual control mechanism of the lathe the bracket member 62 may be caused to move in any desired direction in a horizontal plane.

A tool support 80 is carried by the bracket 62. As best illustrated in Figs. 3 and 4 the tool support 80 is provided with a flat lower face 82 which rests in flat contacting relationship with respect to the flat horizontally directed upper face of the foot 60 of the bracket 62. It is secured to the foot 60 for pivotal movement about a vertical axis by means of a shouldered screw 84 which extends downwardly and rotatably through the lower end of the tool support 80 and threads into the foot 60. The tool support 80 extends upwardly and rearwardly from its area of contact with the foot 60 in relatively closely spaced relationship with respect to the main body portion of the bracket 62 and projects above the level of the latter. Its upper end is slotted as at 86 for reception of a cutting tool such as 88 and the bottom of the slot 86 is shaped for complementary reception of a tool receiving segment 90 which is adjustable in the slot 86 for the purpose of adjusting the vertical position of the point of the tool 88 in accordance with conventional practice.

The upper slotted end of the tool support 80 is closed by the widened forward end portion 92 of the elongated handle member 94 secured to the upper end of the tool support 80 by means of screws 96. A clamping screw 98 threaded downwardly through the widened forward end portion of the handle member 94 centrally of the slot 86 provides a means by which the tool 88 may be secured in the slot 86 in axially and swivably adjusted position. It will be appreciated that the depth of the slot 86 in the tool support 80 is such that a tool bit such as 88 mounted therein will be arranged with its cutting point substantially on the level of the axis of the spindle 16 and consequently on the axis of rotation of a piece of work such as 20 carried by the spindle 60.

It will be appreciated from the foregoing that in view of the fact the tool support 80 and, therefore, the tool bit 88 is mounted upon the bracket 62, the point of the tool bit 88 is, therefore, capable of being moved in any horizontal direction by suitable manipulation of the control handle 28 and control levers 34 and 38 in the same manner as the bracket 62 as above described. Additionally, because the tool support 80 is mounted for rotation about the screw 84, the point of the tool bit 88 may be caused to describe an arc about the extended axis of the screw 84 by a workman grasping the handle member 94 and simply causing the tool support 80 to pivot about the axis of the screw 84. Thus when operating upon a piece of work such as 20 to form a partially spherical surface such as 22 thereon, or to form a radius on a piece of work, the point of the tool bit 88 may be fed axially with respect to the work by manipulation of the hand wheel 28, or the hand lever 38 when the compound slide 36 is in the position illustrated in the drawings, and may be fed crosswise of the work through manipulation of the hand lever 34 for the cross-slide 32 or by the hand lever 38 for the compound slide 36 when the latter is turned in parallelism with the cross-slide 32. If the handle 94 is oscillated during such feeding movement the tool bit 88 will be caused to describe an arc as it is being fed into the work and if the bracket 66 is adjusted transversely of the ways 24 on the member 50 so that the extended axis of the screw 84 intersects the axis of rotation of the work 20, then the surface formed on the work by the point of the tool 88 will, of course, be a partially spherical surface. If the extended axis of the tool does not intersect the axis of rotation of the work, then a radius will simply be turned on the work. Whether the spherical surface or radius thus turned on the work will be a convex or a concave surface will, of course, depend upon whether the point of the tool bit 88 is to the right or the left, respectively, of the extended axis of the screw 84 as viewed, for instance, in Fig. 3. Where it is to the right as viewed in Fig. 3, and as there shown the point of the tool will turn a convex surface such as 22 upon the contacting part of the work 20. The radius of the surface thus formed will, of course, depend upon and be equal to the distance between the point of the tool bit 88 and the extended axis of the screw 84.

In order to facilitate the setting of the tool bit 88 so that its point is at the exact radial distance from the extended axis of the screw 84 desired for the radius in the finished piece of work, the means illustrated in Fig. 5 is provided. As best illustrated in Fig. 3 the shouldered screw 84 is provided with a central bore 100 and the head thereof is provided with a cross-slot 102 arranged diametrically thereof. As illustrated in Fig. 5 a gage post 104, preferably of cylindrical cross-sectional configuration, is provided with a concentric cylindrical extension 106 at its lower end of a size to be closely but removably received within the bore 100 of the screw 84. If desired its lower end above the extension 106 may be transversely machined for complementary reception in the cross-slot 102. The gage post 104 is thus located, when its extension 106 is received in the bore 100, co-axially with the screw 84. It is of such length that it projects upwardly to a point above the axis of rotation of the work in the associated lathe. Knowing the diameter of the post 104, inside micrometers or other suitable measuring means may be employed to set the point of the tool bit 88 at that distance from the axis of the gage post 104 equal to the exact radius of the radius or of the spherical surface which it is desired to turn upon a piece of work.

If it is desired to turn a convex radius or a convex partially spherical surface such as indicated at 22a in Fig. 7 on the end of a piece of work such as 20a illustrated in that figure, then, of course, the point of the associated tool bit must project beyond the axis of the screw 84 from its point of support in the tool support 80. In such case it is preferred to replace the tool bit such as 88 in the preceding views with a more rigid and extended tool holder such as indicated at 110 in Figs. 6 and 7 and which tool holder in turn supports a tool bit 112 at its outer end and secured against movement therein by means of a clamping screw 114. Because of the long overhang of the tool in the latter described case it is preferable to provide an outboard or steady support for it. This may be conveniently accomplished as illustrated in Fig. 7 which shows such auxiliary support at 116 as comprising a postlike member having a bifurcated upper end in which the tool holder 110 is received and rigidly clamped by means of a screw such as 118. The lower end of the support 116 is provided with a cylindrical extension 120 which is relatively closely received within the bore 100 of the screw 84. Its lower end may be provided with a keylike extension 121 fitting into the slot 102 to aid it in holding the tool holder 110 against undesired movement.

It will, of course, be appreciated that the gage post 104 cannot be used to set the point of the tool bit 112 in the arrangement illustrated in Figs. 6 and 7. However, in order to provide a similar means for accurately setting the point of the tool 112, a horizontally extending bar 122 is provided with a downwardly extending pin 124 at one end thereof which pin is relatively closely but removably received within the bore 100 of the screw 84. Additionally, the bar 122 is provided with a key-like downward projection 126 on both sides of the pin 124 which is received within the diametrical slot 102 of the screw 84 so as to locate it angularly with respect to the axis of the screw 84. The opposite end of the bar 122 is provided with an upwardly projecting gage bar 128 the axis of which is located in parallelism with the axis of the pin 124 and at a known distance therefrom. When employing the gage 122—124—128 to set the point of a bit such as 112 from the axis of the screw 84 suitable measuring means may be employed to set the point of the bit 112 at such distance from the gage post 128 that it will be at the desired radial distance from the axis of the screw 84, as will be readily appreciated.

The circular extent of a radius or of a partially spherical surface thus formed on a piece of work by a tool bit of the type described will, of course, depend upon the relative diameter of the work with respect to the radial distance which the point of the tool bit is set from the axis of the bolt 84. It will be appreciated that by the apparatus described a convexly curved partially spherical surface of almost completely spherical conformation may be formed, but where a concave partially spherical surface is to be formed its maximum angular extent will be slightly less than 180 degrees with a single setting of the associated tool bit.

It will be appreciated by those skilled in the art that because of the fact that the tool support 80 is carried by the end of the bracket 62 which is supported directly upon the member 50 carried by the tail stock ways 46 and 48, and that the point of connection of all these parts is approximately in the plane of the latter mentioned ways, an extremely rigid and sturdy construction is provided, particularly in view of the fact that the pressure of the work during a turning operation will be downwardly and thus in a direction tending to force all of the parts into firm engagement with each other. The sturdiness and rigidity of the construction is further enhanced by the fact that the upper end of the bracket 62 is supported on the compound slide 36 in exactly the same manner as conventional tool posts. Thus the bracket 62 is in reality held against undesirable deflection or movement at opposite ends thereof, the result being that the support of the tool bit is so rigid and firm that unusually heavy cuts may be taken with the fixture described, as compared to constructions heretofore suggested, without undue or unusual deflection of the cutting point of the tool. Furthermore, the tool may be manipulated and fed into the work either transversely or longitudinally of the ways, as desired, in the same manner as those radius fixtures heretofore proposed and supported solely from the compound slide of the lathe. The construction, therefore, provides all of the advantages of constructions heretofore suggested together with the added advantage of being of materially greater rigidity and strength, enabling a radius to be turned upon a piece of work, either spherical or otherwise, in a quick, simple and efficient manner.

There may be instances where it is desired to employ a radius forming fixture of the general type described for so-called mass production purposes in which case it may be desirable to turn the fixture about the axis of the screw 84 by power instead of relying upon the workman to turn it by hand. In such case the above described mechanism may be modified as follows and as illustrated in Figs. 8 and 9. Referring to these last two figures it will be noted that the bracket 62 adjacent the foot 60 thereof is provided with a pair of transversely spaced forwardly projecting ears 130 each provided with a bushed opening therein in which a splined shaft 132 is rotatably mounted. The shaft 132 non-rotatably receives thereon a worm gear 134. The lower rear edge of the tool support 80 is formed to provide a worm wheel segment 136 thereon in concentric relation with respect to the axis of the screw 84 and in meshing relation with respect to the worm 134. The worm 134 may be rotated from some driven part of the lathe in any suitable manner, the particular means shown comprising a flexible shaft 138 of conventional construction non-rotatably secured at one end to the shaft 132. Its opposite end may be non-rotatably secured, preferably through some simple form of clutch mechanism, to any suitable rotating part of the lathe as, for instance, one end of the feed screw 30. With this construction it will be appreciated that when the flexible shaft 138 is rotated, causing a corresponding rotation of the worm 132, the worm 132 in rotating in meshing engagement with the worm wheel segment 136 will cause the tool support 80 to be rotated about the axis of the screw 84 and thus effect the same movement of the tool support 80 and the tool carried thereby as may be occasioned by a workman grasping the handle 94.

Having thus described my invention, what I claim by Letters Patent is:

1. In a radius fixture for lathes of the class wherein there are longitudinally extending ways, a carriage is movable longitudinally on said ways, and a slide structure is carried by said carriage for slidable movement thereon in a direction transverse to the direction of movement of said carriage on said ways, the combination with said ways and slide structure of a member adapted for slidable reception on said ways for movement longitudinally thereof independently of said carriage, a second member slidably mounted on the first-mentioned member for movement in a direction transversely of the length of said ways, means adapted to interconnect said second member and said slide structure for simultaneous movement both longitudinally and transversely of said ways, a tool holder mounted on said second member for pivotal movement about a vertical axis, and means for rotating said tool holder about said axis.

2. In a radius fixture for lathes of the class wherein there are longitudinally extending ways, a carriage is movable longitudinally on said ways, and a slide structure is carried by said carriage for slidable movement thereon in a direction transverse to the direction of movement of said carriage on said ways, in combination, a member adapted for application to said ways in bridging relation with respect thereto and having its opposite end portions formed for slidable reception on said ways, a second member mounted on the first-mentioned member and guided for movement thereon in a direction transverse to the length of said ways when said first-mentioned member is operatively associated with said ways, a part fixed with respect to said second member and adapted to be fixed to said slide structure whereby to connect said second member to said slide structure for equal movement both transversely and longitudinally of said ways, a tool support mounted on said second member for pivotal movement about a vertical axis fixed with respect to said second member, and means for swinging said tool support about said axis.

MAURICE J. GIELEGHEM.